United States Patent [19]

Jacobs et al.

[11] Patent Number: 4,891,576
[45] Date of Patent: Jan. 2, 1990

[54] GROUND-BASED TRANSMISSION LINE CONDUCTOR MOTION SENSOR

[75] Inventors: Malin L. Jacobs; Umberto Milano, both of Littleton, Colo.

[73] Assignee: The United States of America as represented by the Secretary of the Interior, Washington, D.C.

[21] Appl. No.: 234,768

[22] Filed: Aug. 22, 1988

[51] Int. Cl.⁴ ............................................. G01R 31/02
[52] U.S. Cl. ..................................... 324/72; 324/7.25; 324/457
[58] Field of Search ................. 324/27, 72.5, 457, 458, 324/117 R, 555

[56] References Cited

U.S. PATENT DOCUMENTS

| | | | |
|---|---|---|---|
| 2,061,115 | 11/1936 | Tebo et al. | 324/72 |
| 3,564,529 | 2/1971 | Kaufman et al. | 324/72 X |
| 4,135,152 | 1/1979 | Stuchly et al. | 324/117 |
| 4,424,481 | 1/1984 | Laroche et al. | 324/458 X |

Primary Examiner—Reinhard J. Eisenzopf
Assistant Examiner—Robert W. Mueller
Attorney, Agent, or Firm—E. Philip Koltos

[57] ABSTRACT

A ground based conductor motion sensing apparatus is provided for remotely sensing movement of electric power transmission lines, particularly as would occur during the wind induced condition known as galloping. The apparatus is comprised of a motion sensor and signal generating means which are placed underneath a transmission line and will sense changes in the electric field around the line due to excessive line motion. The detector then signals a remote station when a conditioning of galloping is sensed. The apparatus of the present invention is advantageous over the line mounted sensors of the prior art in that it is easier and less hazardous to install. The system can also be modified so that a signal will only be given when particular conditions, such as specific temperature range, large amplitude line motion, or excessive duration of the line motion, are occurring.

10 Claims, 4 Drawing Sheets

GROUND-BASED TRANSMISSION LINE CONDUCTOR MOTION SENSOR

FIELD OF THE INVENTION

The invention relates to a ground-based sensing apparatus which allows for remote sensing of excessive motion by electric power transmission lines.

BACKGROUND OF THE INVENTION

One of the major problems in the electric power transmission industry is the damage caused by different types of wind-induced transmission line conductor motion. This wind-induced motion can lead to problems such as phase-to-phase faults, transmission line damage, and transmission line tower metal fatigue due to large, relatively rapid periodic motions of the conductors. The problem is widespread enough that power administration agencies all over the world have looked for ways to gather data on such transmission line conductor motion in an attempt to reduce or eliminate the motion and its associated problems.

One particularly severe type of wind-induced transmission line motion is a condition known as galloping. Essentially, galloping occurs when wind impinges upon an iced conductor line, often causing induction of lift in much the same manner as lift is induced on an airplane wing. The wind-induced lift caused during galloping causes the conductor to twist as it moves, and this twisting results in primarily vertical oscillation of the conductor. These oscillations can become quite complex, and often lead to the types of problems discussed above, including phase-to-phase faults and transmission tower damage. The need for a means of monitoring and controlling the conditions cause by galloping is of utmost importance in the power transmission industry.

Unfortunately for investigators in this area, the conditions under which galloping occurs are relatively rare. Among these conditions are the need for temperatures to be within a fairly narrow range centered around zero degrees centigrade, the presence of rain or sleet which allows for ice to form, and the wind impinging upon the power line must be coming from only particular directions. Because of these requirements, transmission line galloping seldom occurs when people are around to observe it. As a result, methods of detecting galloping and notifying potential observers or investigators have involved remote sensing and signalling of the conditions.

The most popular method used at present to detect galloping involves the installation of load cells on transmission towers associated with lines where galloping is suspected to occur. In this method, load cells are installed in the insulator string of the transmission tower, and the cell output triggers a signalling device such as a radio which alerts a remote observer to the condition. At this point, an observer or investigator can travel to the site where galloping is occurring in order to monitor and record the phenomena and its effects. The load-cell method, however, suffers from several drawbacks. In particular, the line which is to be monitored must be deenergized, or other safety precautions must be taken, when installation of the load cell occurs. Also, the signal cabling must be run from near the top of the tower to the signalling device, which increases the dangers involved in the cell installation. Furthermore, a bucket truck is required to be brought to the site, no matter what the topography of the particular area is. There clearly exists a need for developing a remote motion sensor for sensing the conditions associated with galloping which does not involve the potentially hazardous or inconvenient installation of sensors on transmission towers.

Other devices and systems are known in the patent art for monitoring power line conditions, but these U.S. Pat. No. 4,135,152 (Stuchly, et al.) and U.S. Pat. No. 4,087,701 (Anderson) both disclose power line monitoring devices which operate by means of a remote line-mounted sensor. Additionally, U.S. Pat. Nos. 4,158,810 (Leskover) and 3,197,702 (Schweitzer, Jr.) disclose telemetering posts for transmission lines which have line-mounted sensors. What is desired, therefore, is the development of a system which employs a ground-based sensor which can effectively monitor wind-induced line conductor motion conditions such as galloping, yet which avoids the problems and hazards associated with the previously used remote line- or tower-mounted sensing devices.

SUMMARY OF THE INVENTION

In accordance with the present invention, a ground-based conductor motion sensing apparatus for remote sensing of movement of electric power transmission lines such as would occur under a condition of galloping is provided which comprises a motion detecting means positioned underneath a transmission line and comprised of a conduction motion sensor capable of sensing changes in the electric field around the line due to line motion and an alarm signal generation means capable of generating an alarm signal when a condition of motion is sensed, and an alarm signal receiving means positioned remotely of the detecting means. A stationing means for positioning the motion detecting means underneath the transmission line is further provided. The apparatus can be made to triger an alarm signal only under conditions associated with galloping, such as particular temperatures, amplitude of wire motion, or duration of the disruptive effect, and as a ground-based system it avoids the problems and hazards associated with the line- or tower-mounted monitors of the prior art.

BRIEF DESCRIPTION OF THE DRAWING FIGURES

DETAILED DESCRIPTION OF THE PREFERRED EMBODIMENTS

The conductor motion sensing apparatus of the present invention operates by sensing, at a point a few feet off the ground, the electric field (or "E-field") under an energized power transmission line. When the power transmission line is motionless, the E-field will oscillate at about 60 Hz (AC) with constant amplitude. If the line moves, it will alternately move closer to and farther away from the measuring point. As long as the frequency of motion is substantially less than 60 Hz, the E-field at the measuring point will resemble an amplitude modulated wave, with a 60 Hz carrier frequency and a modulation frequency equal to the motion frequency. The larger the motion amplitude, the higher the modulation percentage.

In the present invention, line conductor motion is sensed by allowing the E-field to induce a voltage on a sensing device comprising a metallic probe plate followed by a demodulation of this voltage. This result can then be filtered so that the probe is insensitive to motion not caused by a galloping condition. The output signal from such a filter would thus only reflect galloping conductor motion. This output signal can be rectified, with all frequencies above around 0.1 Hz filtered out, so that a DC voltage is provided and the magnitude of that voltage is proportional to conductor galloping magnitude. Another feature of the present invention is that a predetermined time period can be set so that a galloping motion signal will only trigger an alarm after a given duration of time which can be adjusted as needed. Generally, when the voltage associated with conductor motion occurs continuously for this length of time, normally from about 60 to 120 seconds, galloping is thought to be occurring, and a tone-modulated radio signal is emitted from the probe. This duration requirement thus ensures that no alarm signals are sent due to random wind motion, transformer tap changes, faults, or other non-periodic events.

Figure 1:
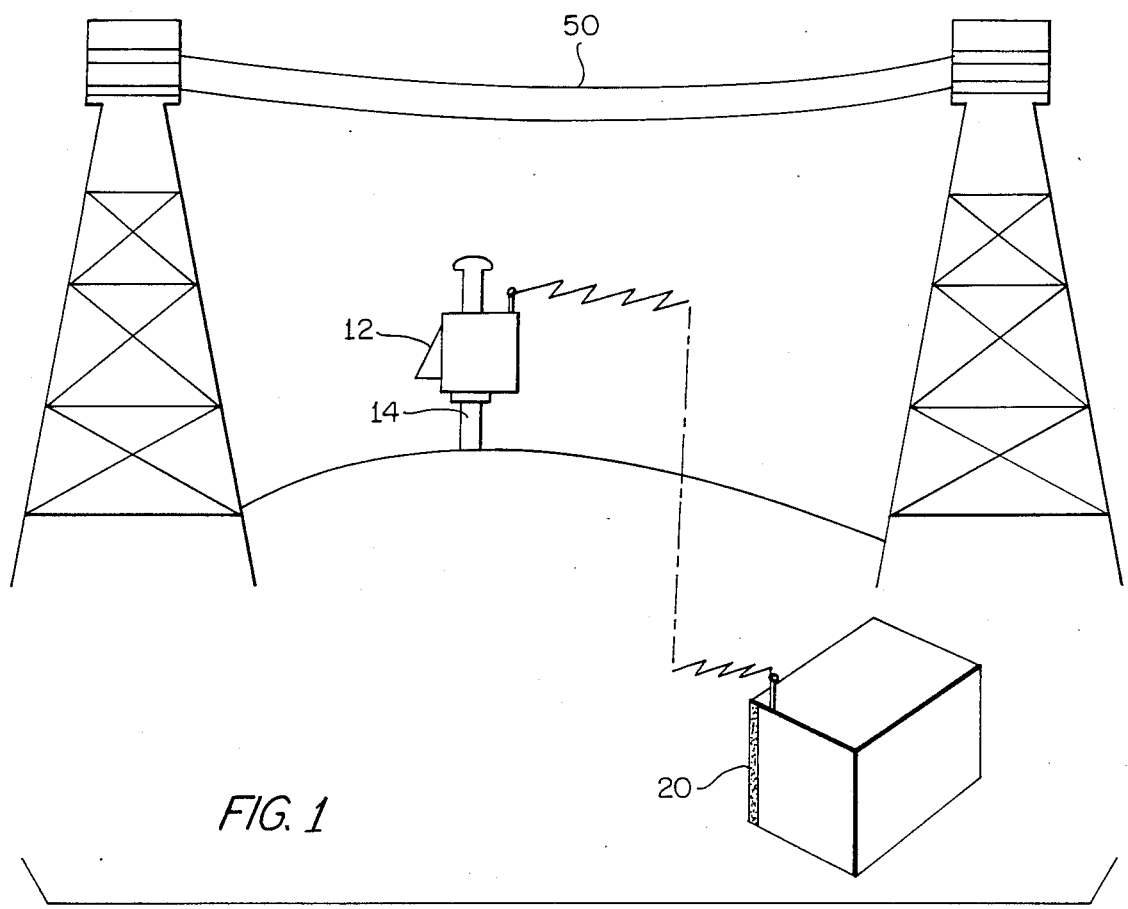
FIG. 1 is a schematic view of the apparatus of the present invention.

The line motion sensing apparatus, as observed schematically in FIG. 1, consists primarily of a motion detecting means or detector package 12, designed to be positioned below a power transmission line 50, and a remote alarm signal receiving means or observer station, indicated at 20, wherein an alarm signal indicative of a condition of galloping at transmission line 50 is triggered. The detector package 12, is preferably installed in the ground via stationing means 14 comprising a steel pipe or other suitable supporting structure. The supporting means will preferably be rigidly secured in place in the ground below the transmission line, as can be achieved by placing the steel supporting pipe a suitable distance in a hole in the ground. It is particularly preferred that the sensing means of the detector package 12 be positioned approximately 8 feet off the ground under wires with normal ground clearances for transmission line voltages greater than about 69 kilovolts.

Figure 3:
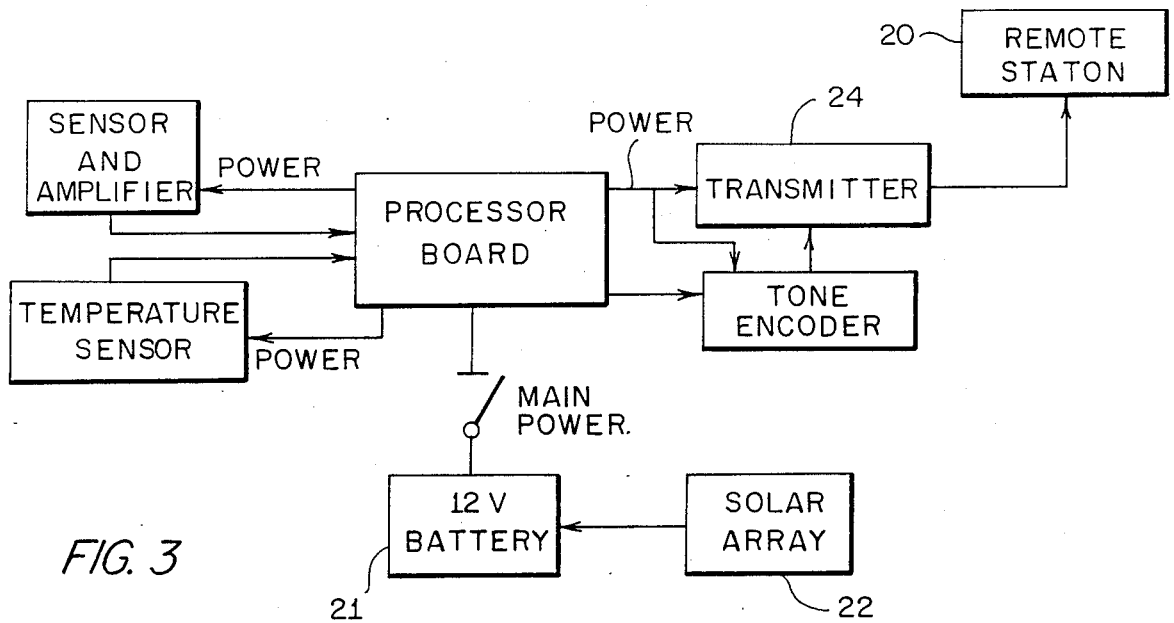
FIG. 3 is a block diagram of the signal processing pathway of the present invention.
Figure 2:
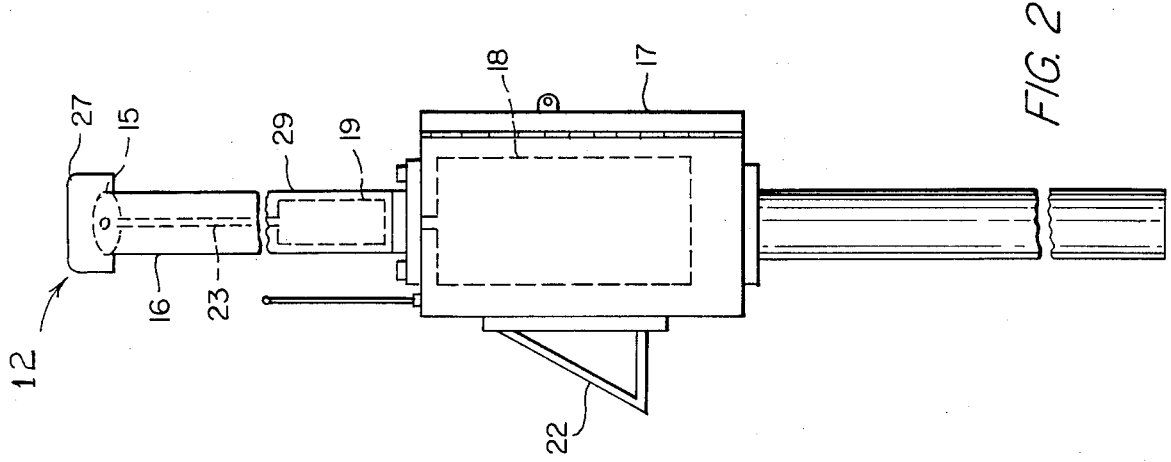
FIG. 2 is a side view of the motion detecting means of the present invention.

The detector package or motion detecting means 12, as observed in FIG. 2 is primarily comprised of a conduction motion sensing means 16 comprising sensor plate 15 and amplifier 19, and a signal processing means 18 by which an alarm signal corresponding to a condition of line galloping can be generated. The sensor plate 15 is preferably a metallic plate made of a good conductor such as copper, aluminum, etc. In the preferred embodiment, sensing means 16 and signal processing means 18 are enclosed in a package comprising a Nema 4 enclosure 17 having a PVC pipe 29 on top and PVC cap 27, as can be observed in FIG. 2. The enclosure 17 will contain elements such as a battery (e.g., a 23 AH battery), fuse, power switch, mobile radio, tone encoder, electronics processing package, and interconnecting cabling (not shown), as will be needed to monitor the condition of galloping at the transmission line. A block diagram of the motion detecting means 12 is presented in FIG. 3. As can be observed, the battery (e.g. 12-volt battery) 21 can be charged by solar array 22. In the block diagram, the condition of conductor motion as sensed by the sensor plate and amplifier is processed by processing means 18 (such as a processor board) so that a signal can be transmitted by transmitter 24 to remote station 20 when a condition of galloping is sensed. The sensing means 16 will undergo a change of voltage in proportion to the changes in the E-field caused by line motion, and this voltage change is transmitted to the signal processing means.

The sensing means 16 comprising sensor plate 15 and amplifier 19, is preferably connected by a brass rod 23 which runs from plate 15 through amplifier 19 and into the signal processing means 18. The induced voltage occurring in plate 15 will vary from approximately 25 Vrms to about 160 Vrms depending upon the line voltage and sensor plate location. A schematic diagram for the sensor/amplifier means of the present invention is provided in FIG. 4. In the sensing means, an input filter is preferably provided comprising elements R1-R3, R5, C1 C2 and C4 which form a critically damped low pass filter with a −3 dB point of 200 Hz. At 168 MHz, the filter output is theoretically down 240 dB, which prevents the transmitter RF energy from entering the signal probe processing circuitry via the detector plate. Signal attenuation occurs via R5 in conjunction with R2 and R3, which attenuate the 60 Hz input signal to a value within the dynamic range of the probe. The high values of R2 and R3 (about 10M) are provided in order to limit the current and prevent damage to A1 in the event of abnormally high detector plate voltage. A1 is a buffer amplifier that converts the high impedance signal of the detector plate and 200 Hz filter to a low impedence signal to drive the rest of the probe circuitry.

Figure 4:
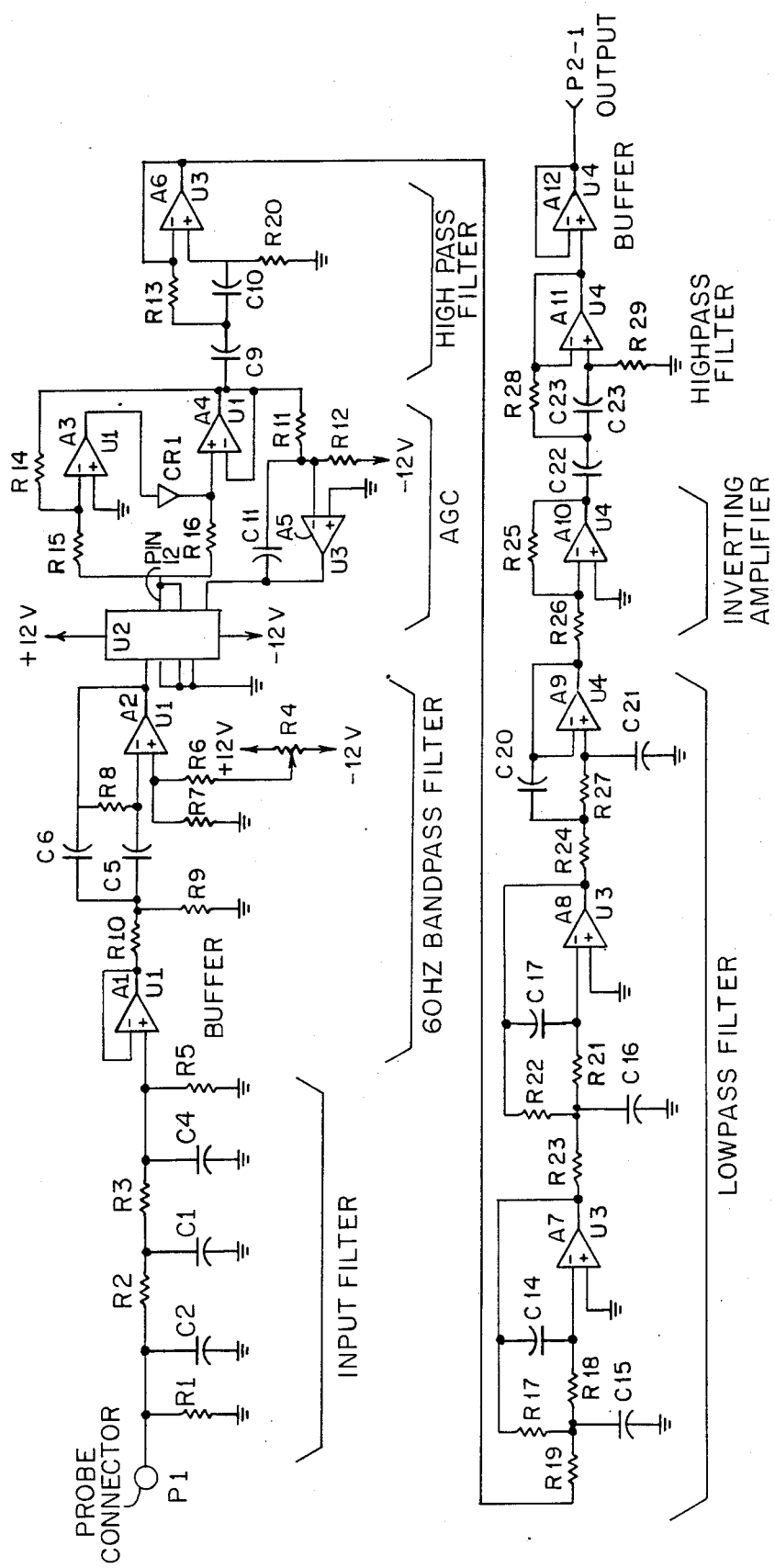
FIG. 4 is an electronic schematic diagram of the conductor motion sensing means of the apparatus of the present invention.

The sensing means is also provided with a 60 Hz bandpass filter as indicated in the schematic of FIG. 4. The filter is comprised of elements R8-R10, C5-C6, and A2 which forms a 60 Hz bandpass filter with quality factor Q=3 and gain=1. This filter is employed to only allow signals within approximately a 10 Hz range of 60Hz to pass. Additionally elements R4, R6, and R7 provide offset adjustment for A2. This adjustment is necessary to guarantee a correctly rectified signal at the output of A4.

An automatic gain control (AGC) circuit is also provided in the sensor which is formed by U2, A3-A5, R11-12, R14-16, C11, and CR1. The element U2 is an analog divider integrated circuit. The numerator is the signal from A2, while the denominator is the signal from A5. Elements A3, A4, CRI and R14-16 comprise an absolute value subcircuit, while R11, R12, C11, and A5 form an integrator with a time constant of about 100 seconds.

In operation, the AGC circuit begins to function when a 60-Hz signal is applied to the numerator of U2. This provides an output at pin 12 which is fed to the absolute value subcircuit. The output of A4 is a full-wave rectified sine wave. This is fed to the integrator which eliminates the AC component and integrates the difference between the DC currents in R11 and R12. This difference will be zero, and integration will stop, when the DC voltage at the output of A4 is approximately 2.4 volts. The integrator output is the denominator voltage of U2. Thus, the integrator adjusts the denominator (and hence gain) of U2 to maintain a DC component of the rectified sine wave at around 2.4 volts. If the input signal is small, the denominator voltage will be small, resulting in a large gain at U2, while if the input signal is large, the denominator voltage will be large and a small gain will result at U2. Since both the input and output signals of U2 are sinusoidal, the AGC circuit maintains a constant amplitude rectified output at U4. The 100-second time constant prevents the AGC circuit from responding to modulation at the gallop frequencies, even at very low denominator voltages (where any AC at the output of A5 will be the largest percentage of the DC voltage). The result is that, within the input adjustment range of the AGC, the steady-state signal voltage at the output of A4 is essentially constant, regardless of the input voltage at P1. Thus, the sensing means adjusts itself for proper operation over a wide range of transmission line voltages and ground clearances.

The other elements of the sensing means as indicated at the schematic of FIG. 4 include R13, R20, C9, C10 and A6 which form two poles of a 4-pole, 0.25-Hz high pass filter. This stage has a gain of one and a Q of 0.54. Elements A7-A9 and the associated components form a 6-pole Butterworth low pass filter with a cutoff frequency of 10 Hz and a gain of 5.3. This filter eliminates any system response to conductor motions of too high a frequency to be caused by galloping. Elements R25, R26, and A10 form an inverting amplifier with gain.

The final two poles of the 4-pole high pass filter are provided by elements C22, C23, R28, R29 and A11. This stage has a gain of one, and a Q of 1.3. This 4-pole filter eliminates signals due to very slow conductor motion, that is, motion below the galloping frequency range. This filter is split into two parts to take advantage of the inherent ability of a high pass filter to block DC voltages. The A6 section keeps the DC voltage at the output of A4 out of the 10-Hz low pass filter, where the filter gain could cause amplifier saturation. The A11 section blocks any DC offset generated and amplified by elements A7-A10. This would be offset voltages that are multiplied by the gains of A7-A10 (total gain equals fifty). Since the gains of A11 and A12 equal one, no significant DC voltage appears at the output of A12. Element A12 is a unity gain output buffer. The output of A12 is a low impedance AC signal, the magnitude of which follows the conductor motion. A indicated in the probe block diagram of FIG. 3, the signal from the sensor and amplifier corresponding to the change in the E-field around the transmission lines due to the conductor motion is then transmitted to a processor board or other signal processing means.

Figure 5:
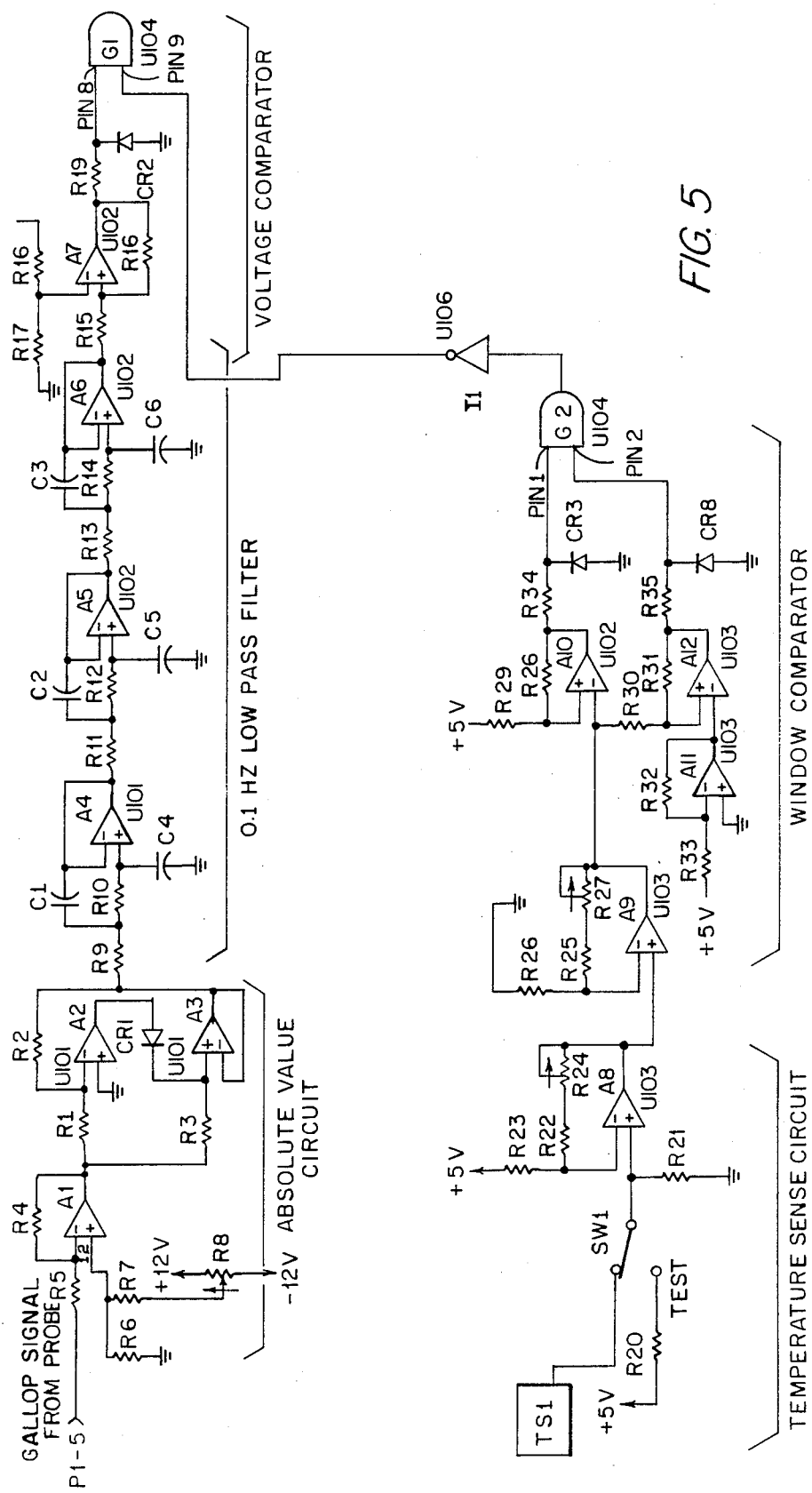
FIG. 5 is a partial electronic schematic diagram of the signal, processing means of the present invention.

Various aspects of the preferred alarm signal processing means for the apparatus of the present invention can be best observed in the partial schematic drawing of FIG. 5. Any suitable signal processing means which can receive voltage information from the detector plate and create an alarm signal when the particular condition of galloping is sensed can be employed in the present invention. However, it is particularly preferred that the processing means of the invention comprise a processor board which possesses features such as an absolute value circuit, low pass filter, and a comparator, and these features can be observed in the schematic of FIG. 5. In the schematic, elements R1-R8, A1-A3, and CR1 form an absolute value circuit. Element R8 adjusts the circuit for symmetrical rectification. Elements R9-R14, C1-C6, and A4-A6 comprise a six-pole low pass filter with a cutoff frequency of 0.1 Hz.

In the preferred apparatus of the present invention, the signal from the sensor and amplifier is an AC voltage analog of the conductor motion. The absolute value circuit and low pass filter process this to a very low-ripple DC voltage at the output of element A6. The magnitude of this voltage represents the average conductor motion amplitude.

Elements R15-R18 and A7 form a voltage comparator. As long as the output of A6 is less than the comparator threshold of about +2.5V (set by R16 and R17), the output of A7 is low, indicating insignificant conductor motion. If the voltage at the output of A6 exceeds 2.5V, the output of A7 will go high, indicating significant conductor motion. Element CR2 prevents the input of G1 from going negative, and element R19 limits the current through CR2 when the output of A7 is negative. The net result is that the pin 8 input of G1 is low when conductor motion is below the threshhold, and high when conductor motion is above the threshhold.

The signal processing means of the present invention will contain other features which are designed to aid in the monitoring of galloping conditions. One such feature is the temperature sensor and temperature sense circuit which can also be observed in the schematic of FIG. 5. Element TSI of the schematic represents a monolithic temperature sensor which outputs a current of 1A/degree K with switch SW1 in the normal position. This current passes through R21, generating a voltage. Elements R22-R24 and A8 amplify this voltage and offset it so that zero degrees C corresponds to 0V at the output of A8. Elements R25-27 and A9 scale the output of A8 so that at temperature change of 1° C. will cause a corresponding voltage change of 0.5 volts. Therefore, the voltage at the output of A9 represents the measured temperature with a scale factor of 2.0 degrees C/volt.

Elements R28-R33 and A10-A12 form a window comparator. The output of A10 will be high whenever the temperature is less than the top end of a pre-set temperature range (e.g., around 10° to 15° C.), and the output of A12 will be high whenever the temperature is greater than the bottom end of the desired temperature range (e.g., around −10° to −15° C.). This aspect of the invention can be used to ensure that a signal corresponding to a condition of galloping only is given when the temperature is around 0° C. Normally, the preferred temperature range for this sensor is set so that signal transmission is only possible at a range of temperature preferably from about −10° C. to 10° C. Elements R34 and CR3 prevent pin 1 of G2 from going negative when the output of A10 goes negative. Likewise, R35 and CR8 prevent pin 2 of G2 from going negative when the output of A12 goes negative. Elements G2 and I1 together form an AND gate, the output of which will be high whenever the measured temperature is within the preferred temperature range. At all other times the output of I1 will be low. Therefore pin 9 of G1 (the enable gate) is high whenever the temperature is within the preferred temperature range (e.g., between −10° C. and +10° C.).

The temperature sense circuit of the invention thus will serve to enable the processor when the temperature is conducive to galloping, and will disable the processor at all other times. Additionally, when switch SW1 is placed in the test position, a voltage of 2.73 volts appears on R21 by voltage divider action between R20 and R21. This corresponds to a temperature of 0° C. The temperature sensing circuit will thus enable the processor, so that tests can be performed without regard to the actual temperature.

The processing means of the present invention also preferably includes a random event elimination circuit (not shown) which will operate to prevent transmission of the signal unless the particular conditions associated with galloping exist. This circuit can be connected to a timing device which requires that the conductor motion must occur for a particular time period before the alarm signal will be generated. Generally, a time period of from about 60-120 seconds (preferably around 90 seconds) should be programmed into the processing means so that only sustained conductor motion of this time duration allows generation of the alarm signal.

In addition, the circuit can be set so that only line motion of a particular amplitude will trigger a signal. Generally, conductor line motion of about one foot or greater is usually associated with galloping, and the circuit can be made to trigger a signal only when such line amplitude is reached. The random event feature will be needed to prevent the processor from responding to random events which change the sensed electric field, such as transformer tap changes, false, or wind gusts, yet which do not cause sustained conductor motion. By employing such a random event eliminator, along with the temperature sensor as described above, the device of the present invention will generate a signal only when: (1) the temperature is between about $-10°$ C. and $+10°$ C., (2) the conductor motion exceeds about one foot, and (3) the conductor motion is continuous for a period of at least about 60-120 seconds. Thus, when such conditions prevail, it is thus very likely that a galloping event is occurring.

Another feature which can be employed in the present invention is a thirty day timer (not shown) which can emit a radio signal for the purpose of notifying the observer station that the detector is still functioning. At thirty day intervals, the detector package emits a signal which is similar to the transmission which would occur when galloping conditions exist. Should the weather conditions at that time also favor galloping, the observer will have to physically determine if the signal is due to galloping or if it is a notification transmission of the timer.

Other features that can be employed in the invention are a power-up disable circuit which prevents the transmitter from being keyed during power-up, and a five volt reference for use in the temperature sensor circuit. The processing apparatus is preferably powered by a twelve volt battery and this battery charge is preferably maintained by a solar array.

Figure 6:
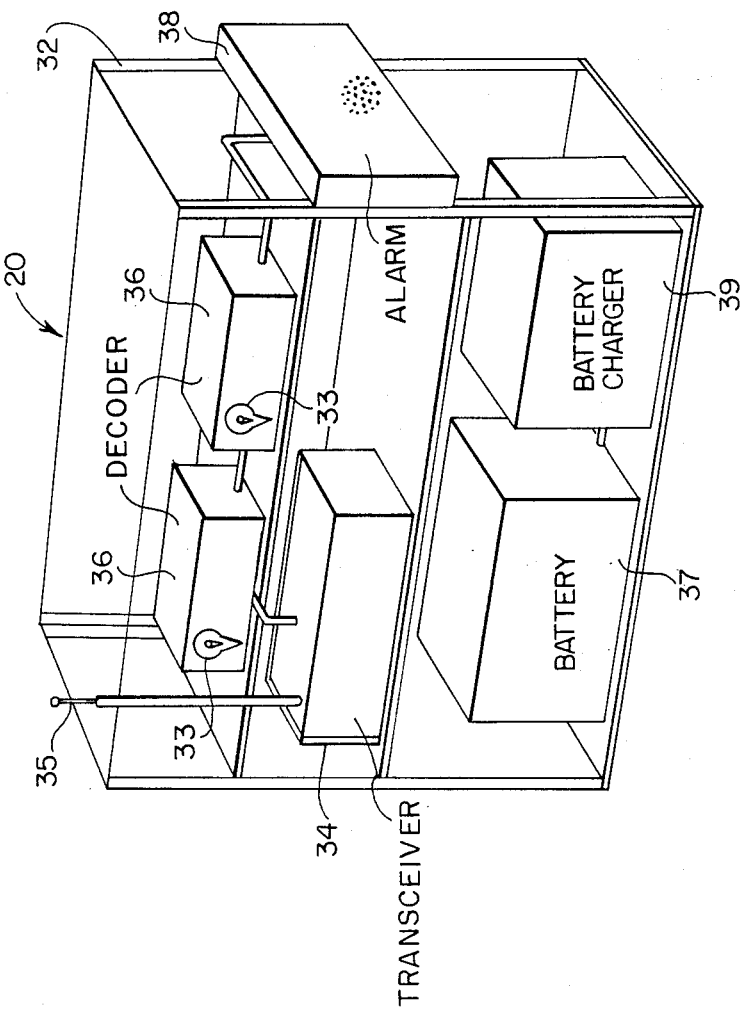
FIG. 6 is a schematic view of the alarm signal receiving means of the present invention.

The alarm signal receiving means 20 of the present invention, or observer station, such as observed in FIG. 6, is positioned remotely from the sensing means. The station 20 can be housed in a metal cabinet 32 and preferably includes a transceiver or radio 34 having antenna 35, tone decoders 36, an alarm 38, a battery 37, and a battery charger 39. In operation, the transceiver is placed in the receive mode. The received frequency is the same as the probe or sensing means transmit frequency. When galloping occurs, the sensor package transmits a tone-encoded signal which is received by the transceiver and sent to the tone decoders, the inputs of which are wired in parallel. If the tone frequency received is not the same as the decoder frequency, the signal will be ignored. If any of the observer decoders are at the frequency of the encode tone, that decoder will respond. A light 33 provided on the decoders 36 will be turned on, indicating to the observer which frequency was received, and a relay in the decoder will operate to apply power to the audible alarm. The alarm will continue to sound until the decoder is manually reset by means of a reset button placed on the front of the decoder. The signal receiving means or observer station can be powered by a battery (e.g., 12 volt, 23 A-H) which is continually charged by a battery charger powered from the AC line.

The alarm signal receiving means or observer station thus operates to receive a radio signal from the sensing means, decode the tone, and activate an alarm signal. When the alarm signal is activated, this will indicate that the transmission line above the sensing means is in a condition of galloping. An operator at the observer station can be ready to take appropriate action when such a signal is generated. By use of the present invention, a safe, ground-based means is thus provided for detecting the conditions of galloping and remotely signalling an observer who can then investigate the conditions and further research the effects of galloping.

What is claimed is:

1. A ground-based conductor motion sensing apparatus for remote sensing of movement of electric power transmission lines comprising:
   a ground based motion detector comprising a conductor motion sensing means capable of sensing changes in the electric field surrounding an energized transmission line due to the motion of the transmission line and an alarm signal generation means capable of generating an alarm signal when a condition of transmission line motion is sensed; and
   an alarm signal receiving means capable of receiving the signal generated from said alarm signal generating means and triggering an alarm in response to said signal which indicates that transmission line motion has been sensed.

2. An apparatus according to claim 1 further comprising stationing means for positioning said motion detector at a point under an electric power transmission line.

3. An apparatus according to claim 1 wherein the conductor motion sensing means undergoes a change in voltage proportional to changes in the electric field surrounding the transmission line.

4. An apparatus according to claim 1 wherein the conductor motion sensing means comprises a metallic plate and an amplifier.

5. An apparatus according to claim 1 wherein the motion of the transmission lines must be continuous for a given period of time before a signal is generated.

6. An apparatus according to claim 5 wherein the motion of the transmission lines must be continuous for a period of about 60-120 seconds before a signal is generated.

7. An apparatus as claimed in claim 1 wherein the motion of the transmission lines must be at least about one foot in amplitude before an alarm signal is generated.

8. An apparatus according to claim 7 wherein the temperature sensor prevents an alarm signal from being generated unless the temperature in the vicinity of the transmission line is about 0° C.

9. An apparatus according to claim 8 wherein the temperature sensor prevents an alarm signal from being generated unless the temperature in the vicinity of the transmission line is between about $-10°$ C. to about $+10°$ C.

10. An apparatus according to claim 1 further comprising a temperature sensor which prevents generation of a signal unless a particular range of temperatures is achieved at the transmission line.

* * * * *